T. A. GOODE.
GEAR SHIFT LOCKING MECHANISM.
APPLICATION FILED MAR. 18, 1919.
1,307,354.
Patented June 24, 1919.
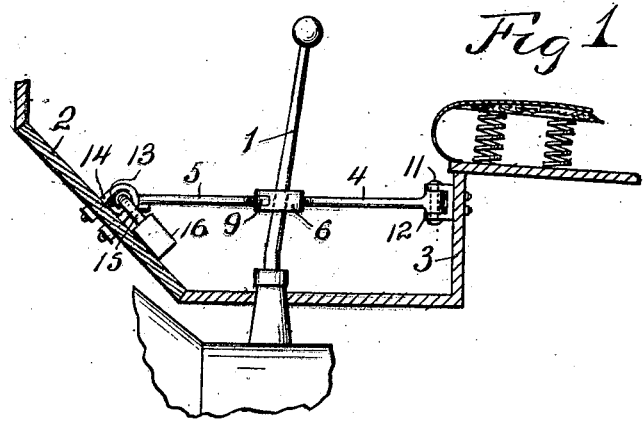
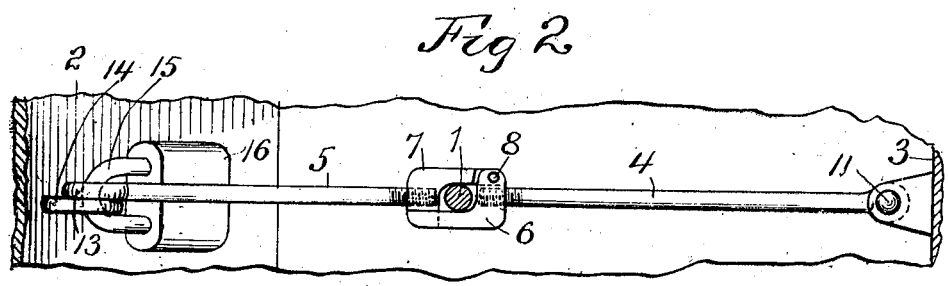
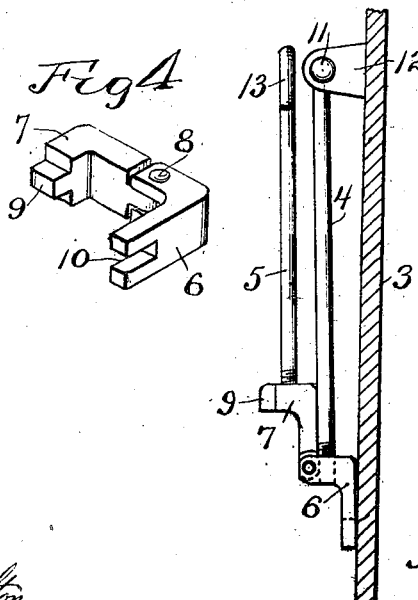
INVENTOR
Thomas A. Goode
BY
Warren D. House
His ATTORNEY
witness:
R. L. Hamilton

UNITED STATES PATENT OFFICE.

THOMAS A. GOODE, OF KANSAS CITY, KANSAS, ASSIGNOR OF ONE-THIRD TO CALVIN M. HINDS, OF KANSAS CITY, MISSOURI, AND ONE-THIRD TO JULIUS BRAGG, OF HUNTINGTON, OREGON.

GEAR-SHIFT-LOCKING MECHANISM.

1,307,354.   Specification of Letters Patent.   Patented June 24, 1919.

Application filed March 18, 1919. Serial No. 283,323.

*To all whom it may concern:*

Be it known that I, THOMAS A. GOODE, a citizen of the United States, residing at Kansas City, in the county of Wyandotte and State of Kansas, have invented a certain new and useful Improvement in Gear-Shift-Locking Mechanisms, of which the following is a specification.

My invention relates to improvements in gear shift locking mechanisms.

The object of my invention is to provide a novel mechanism for locking the shift lever of an automobile, which is simple in construction, which may be quickly locked and unlocked, which when not in use can be stored in compact form out of the way of the occupants of the automobile, and which in the locked position will securely hold the gear shift lever in the neutral position, so as to prevent unauthorized use of the machine.

The novel features of my invention are hereinafter fully described and claimed.

In the accompanying drawing which illustrates the preferred embodiment of my invention, Figure 1 is a side elevation of my improved locking mechanism shown in the locking position on an automobile a portion of which is shown in vertical section.

Fig. 2 is a horizontal section on the line 2—2 of Fig. 1.

Fig. 3 is a top view showing the two locking members folded parallel with the seat.

Fig. 4 is a perspective view of the two jaws of the locking members.

Similar reference characters designate similar parts in the different views.

1 designates the usual upright shift lever of an automobile, 2 the foot board and 3 the front board of the seat.

4 and 5 designate respectively two locking members, the adjacent ends of which are respectively provided with right-angled jaws 6 and 7 having threaded holes in which the screw-threaded ends of the members 4 and 5 are respectively fitted.

The jaws 6 and 7 are hinged to each other by means of a vertical pin 8.

As shown in Fig. 4, the jaw 7 is provided with a projection 9 which is adapted to enter a notch 10 in the jaw 6. The rear end of the member 4 is pivoted by a vertical pin 11 to a bracket 12 which is fastened to the front board 3 of the seat directly in the rear of the shift lever 1.

The forward end of the member 5 is provided with an eye 13, adapted to register, when the members 4 and 5 are alined with each other in the locking position shown in Figs. 1 and 2, with a staple 14, which is fastened to the upper side of the foot board 2, in front of the shift lever 1. The staple 14 and eye 13 are adapted to receive the hasp 15 of a padlock 16 for holding the members 4 and 5 in the locking position. When said members are in the locking position, the jaws 6 and 7 are interlocked with each other at their free ends and are adapted to embrace and hold the gear shift lever 1 in the neutral position, as shown in Figs. 1 and 2.

When it is desired to operate the machine, the padlock hasp 15 is detached from the eye 13 and staple 14, after which the member 5 may be swung on the pin 8 to a position parallel with the member 4, and the latter member may be swung to a position substantially parallel with the front of the seat 3, as shown in Fig. 3. The parts thus disposed will be in compact form out of the way of the occupants of the machine.

To lock the lever 1, it is moved to the neutral position, after which the members 4 and 5 are swung to a position in alinement with each other and at right angles to the seat, with the jaws 6 and 7 embracing the lever 1. The hasp 15 is then passed through the eye 13 and staple 14 and the padlock is locked, thus securely holding the shift lever 1 in the neutral position.

It will be noted that the members 4 and 5 embrace the lever 1 above the fulcrum of the latter. This construction permits the locking mechanism to be applied to automobiles now in use without making any alterations thereto. By having the arm 5 in the locking position fastened to the foot board, the lever is firmly held from movement in any direction.

I do not limit my invention to the structure shown and described, as modifications within the scope of the appended claims may be made without departing from the spirit of my invention.

What I claim is:—

1. In a gear shift locking mechanism, the combination with a gear shift lever, of a seat and a foot board of an automobile, two members hinged to each other, one being hinged to said seat, and means for releasably locking the other member to the foot board when said members are moved to the locking position, said members having means, when in the locking position, for embracing and holding said lever.

2. In a gear shift locking mechanism, the combination with a gear shift lever, of a seat and foot board of an automobile between which the lever is located, two members hinged to each other, one member being pivoted on a vertical axis to said seat and adapted to be swung from a position parallel therewith to a position at right angles thereto, the other member being adapted to be swung from a position parallel with the first named member to a position in alinement therewith, and means for releasably locking the second named member to the foot board, when said members are alined with each other and at right angles to said seat, said members having means, when they are in the last named position, for embracing and holding said lever.

3. In a gear shift locking mechanism, the combination with a gear shift lever movable to and from a neutral position, of a seat and foot board of an automobile, between which said lever is located, two members hinged to each other, one member being pivoted on a vertical axis to the front side of said seat, a staple mounted in said foot board, the other member having an eye, said other member being movable from a position parallel with the first named member to a position in alinement therewith, the first named member being movable from a position parallel with the front of said seat to a position at right angles thereto, the staple and eye being adapted to receive the staple of a padlock when the second named member is in alinement with the first named member and the latter is at right angles to the seat, said members having means, when in the last named position, for embracing and holding said lever in the neutral position.

In testimony whereof I have signed my name to this specification.

THOMAS A. GOODE.